(12) United States Patent
Vacca et al.

(10) Patent No.: US 11,621,604 B2
(45) Date of Patent: Apr. 4, 2023

(54) INTEGRATED ELECTRO-HYDRAULIC MACHINE

(71) Applicant: Purdue Research Foundation, West Lafayette, IN (US)

(72) Inventors: Andrea Vacca, Lafayette, IN (US); Thomas Ransegnola, West Lafayette, IN (US); Federico Zappaterra, West Lafayette, IN (US); Scott David Sudhoff, West Lafayette, IN (US); Robert R Swanson, Lafayette, IN (US); Enrique Busquets, Fountain Inn, SC (US)

(73) Assignee: Purdue Research Foundation, West Lafayette, IN (US)

( * ) Notice: Subject to any disclaimer, the term of this patent is extended or adjusted under 35 U.S.C. 154(b) by 54 days.

(21) Appl. No.: 17/163,407

(22) Filed: Jan. 30, 2021

(65) Prior Publication Data

US 2021/0257880 A1 Aug. 19, 2021

Related U.S. Application Data

(60) Provisional application No. 62/977,374, filed on Feb. 16, 2020.

(51) Int. Cl.
*H02K 7/18* (2006.01)
*H02K 7/00* (2006.01)
(Continued)

(52) U.S. Cl.
CPC ......... *H02K 7/003* (2013.01); *F04D 25/0653* (2013.01); *H02K 1/274* (2013.01);
(Continued)

(58) Field of Classification Search
CPC ........ H02K 7/003; H02K 7/18; H02K 7/1823; H02K 9/06; H02K 9/04; H02K 5/207;
(Continued)

(56) References Cited

U.S. PATENT DOCUMENTS

| 1,911,128 A * | 5/1933 | Apple | F04C 11/008 310/72 |
|---|---|---|---|
| 1,912,737 A | 6/1933 | Svenson | |

(Continued)

FOREIGN PATENT DOCUMENTS

| CA | 2796593 | 5/2013 |
|---|---|---|
| EP | 0478514 | 9/1991 |

(Continued)

OTHER PUBLICATIONS

Zavadinka, Development of a Variable Roller Pump and Evaluation of its Power Saving Potential as a Charge Pump in Hydrostatic Drivetrains, Ph.D. Thesis, Brno University of Technology, 2015.
(Continued)

*Primary Examiner* — Michael Andrews
(74) *Attorney, Agent, or Firm* — Piroozi-IP, LLC

(57) ABSTRACT

An integrated electromechanical and hydraulic system is disclosed which includes an electric machine, the electric machine includes a casing, a stator adapted to remain stationary within the casing, one or more electrically insulated windings coupled to the stator, a rotor separated from the stator and the one or more windings by a radial diamagnetic gap, electrical power couplings, and a first mechanical power couplings, and a hydraulic machine also disposed in the housing, the hydraulic machine having hydro-mechanical couplings as well as a second mechanical power couplings, wherein the second mechanical power couplings are coupled to the first mechanical power couplings.

20 Claims, 14 Drawing Sheets

(51) Int. Cl.
    H02K 1/274    (2022.01)
    F04D 25/06    (2006.01)
    H02K 9/06     (2006.01)
    H02K 5/20     (2006.01)
(52) U.S. Cl.
    CPC ............... H02K 5/207 (2021.01); H02K 9/06 (2013.01); H02K 2201/03 (2013.01); H02K 2205/09 (2013.01)
(58) Field of Classification Search
    CPC ...... H02K 5/20; H02K 1/274; H02K 2201/03; H02K 2205/09; F04D 25/0653; F04D 25/0606
    USPC ........................................................ 310/75 R
    See application file for complete search history.

(56) References Cited

U.S. PATENT DOCUMENTS

| | | | | |
|---|---|---|---|---|
| 3,672,793 | A | * | 6/1972 | Yowell ................ F04B 1/2064 417/415 |
| 4,902,202 | A | | 2/1990 | Bowden |
| 5,219,276 | A | * | 6/1993 | Metzner ............... F04C 15/008 417/423.7 |
| 5,971,717 | A | | 10/1999 | Berthold |
| 6,171,089 | B1 | | 1/2001 | Oehman, Jr. |
| 6,541,884 | B1 | * | 4/2003 | Croci .................... H02P 29/60 310/156.01 |
| 6,699,151 | B2 | | 3/2004 | Grogg et al. |
| 7,267,532 | B2 | | 9/2007 | Krebs |
| 10,247,177 | B2 | | 4/2019 | Ivantysynova et al. |
| 2001/0024618 | A1 | | 9/2001 | Winmill |
| 2002/0104313 | A1 | | 8/2002 | Clarke |
| 2006/0140793 | A1 | * | 6/2006 | Krebs .................... F04C 2/086 417/420 |
| 2008/0044308 | A1 | | 2/2008 | Hoji et al. |
| 2010/0034674 | A1 | * | 2/2010 | Oota ........................ H02K 7/14 310/58 |
| 2012/0079936 | A1 | | 4/2012 | Ivantysynova et al. |
| 2016/0369795 | A1 | | 12/2016 | Vacca et al. |

FOREIGN PATENT DOCUMENTS

| | | |
|---|---|---|
| GB | 781697 | 8/1957 |
| GB | 968998 | 9/1964 |
| WO | WO2001073295 | 10/2001 |

OTHER PUBLICATIONS

Vacca et al., Modelling and experimental validation of external spur gear machines for fluid power applications, Simulation Modelling Practice and Theory, 2011, 2007-2031, vol. 19, Elsevier B.V.
Nieling et al., Design of a Virtually Variable Displacement Pump/Motor, NCFP, 2005, 323-335.
Vacca et al., A Flow Control System for a Novel Concept of Variable Delivery External Gear Pump, 10th International Fluid Power Conference, 2016, 263-276.
Devendran et al., Theoretical analysis for variable delivery flow external gear machines based on asymmetric gears, Mechanism and Machine Theory, 2016, 123-141, vol. 108, Elsevier Ltd.
Rundo et al., Lubrication pumps for internal combustion engines: a review, International Journal of Fluid Power, 2015, 59-74, vol. 16, No. 2.
Devendran et al., Optimal design of gears and lateral bushes of external gear machines, Fluid Power and Motion Control, 2012, 29-48.
Gulati et al., A General Method to Determine the Optimal Profile of Porting Grooves in Positive Displacement Machines: The Case of External Gear Machines, 10th International Fluid Power Conference, 2016, 453-464.
Zhao et al., Numerical analysis of theoretical flow in external gear machines, Mechanism and Machine Theory, 2016, 41-56, vol. 108, Elsevier Ltd.
Devendran et al., Optimal design of gear pumps for exhaust gas after treatment applications, Simulation Modelling Practice and Theory, 2013, Elsevier B.V.
Devendran et al., A novel design concept for variable delivery flow external gear pumps and motors, International Journal of Fluid Power, 2014, 121-137, vol. 15, Taylor & Francis Group.
Hintzsche, Variable Flow Rotor Pump, Fluid Power Innovation & Research Conference, 2016, Minneapolis, MN.
Busquets, An Investigation of Micro-Surface Shaping on the Piston/Cylinder Interface of Axial Piston Machines, Ph. D. Dissertation, Purdue University, 2018.
Dowd et al., Tribological Interaction between Piston and Cylinder of a Model High Pressure Hydraulic Pump, A S L E Transactions, 18:1, 21-30, 1975.
Yamaguchi, Motion of Pistons in Piston-Type Hydraulic Machines, First Report, Bulletin of JSME, vol. 19, No. 130, pp. 402-419, 1976.
Yamaguchi, Motion of Pistons in Piston-Type Hydraulic Machines, Second Report, Bulletin of JSME, vol. 19, No. 130, pp. 402-419, 1976.
Pelosi et al., A Novel Fluid-Structure Interaction Model for Lubricating Gaps of Piston Machines, Proc. of the 5th Fluid Structure Interaction Conference, Crete, pp. 13-24, 2009.
Wondergem et al., The Impact of the Surface Shape of the Piston on Power Losses, FPNI2014 7843, 8th FPNI Ph. D Symposium on Fluid Power, FPNI, Lappeenranta, Finland, pp. 1-12, 2014.
Pelosi, An Investigation on the Fluid-Structure Interaction of Piston/Cylinder Interface, PhD Dissertation, Purdue University, 2012.
Shang et al., A temperature adaptive piston design for swash plate type axial piston machines, International Journal of Fluid Power, 18:1, 38-48, 2017.
Ivantysynova, M. and Huang, Ch., Investigation of the gap flow in displacement machines considering the elastohydrodynamic effect, 5th JFPS International Symposium on Fluid Power. Nara, Japan, pp. 219-229, 2002.
Lasaar, Fine Untersuchung zur mikro-und makrogeometrischen Gestaltung der Kolben/ Zylinderbaugruppe von Schrägscheibenmaschinen.VDI Fortschrittsberichte Reihe 1 No. 364, VDI Verlag Düsseldorf, Germany, 2003.
Lasaar, Eine Untersuchung zur mikro-und makrogeometrischen Gestaltung der Kolben/ Zylinderbaugruppe von Schrägscheibenmaschinen.VDI Fortschrittsberichte Reihe 1 No. 364, VDI Verlag Dusseldorf, Germany, 2003 (Translation of Abstract).
Wieczorek et al., Computer Aided Optimization of Bearing and Sealing Gaps in Hydrostatic Machines—The Simulation Tool CASPAR. International Journal of Fluid Power, vol. 3 (2002), No. 1, pp. 7-20, 2002.
Chacon et al., Advanced Virtual Prototyping of Axial Piston Machines, ASME. Fluid Power Systems Technology, 9th FPNI Ph.D. Symposium on Fluid Power, 2016.

* cited by examiner

INTEGRATED ELECTRO-HYDRAULIC MACHINE

CROSS-REFERENCE TO RELATED APPLICATIONS

The present patent application is related to and claims the priority benefit of U.S. Provisional Patent Application Ser. No. 62/977,374 filed Feb. 16, 2020 the contents of which are hereby incorporated by reference in its entirety into the present disclosure.

STATEMENT REGARDING GOVERNMENT FUNDING

This invention was made with government support under DE-EE0008334 awarded by the US Department of Energy. The government has certain rights in the invention.

TECHNICAL FIELD

The present disclosure generally relates to power transmission systems, and in particular, to an integration of electro-hydraulic system.

BACKGROUND

This section introduces aspects that may help facilitate a better understanding of the disclosure. Accordingly, these statements are to be read in this light and are not to be understood as admissions about what is or is not prior art.

Pumping and motoring devices working in the fluid power field can be designed in a large variety of fashions. Integration of electromechanical systems, e.g., electric motors, with hydraulic systems, e.g., gear pumps, have been guided by two different approach. The first, includes use of internal gear machine, mechanically connected to the electric machine. Examples of such an integration can be found in KR100865196B1 and EP1566545B1. Because of their working configuration they generally require higher production cost, and a more complex design process. Also, they often are less robust than external gear machines. The second approach includes use of external gear machine electromagnetically driven by an electric machine through the casing. Examples of this approach include DE102009027282A1 and US2017/0204854A1. This approach suffers from high expense, and they do not ensure the same power transmission between hydraulic and electric machine.

Therefore, there is an unmet need for a novel approach to integrate power generated from one and transfer to another between electromechanical and hydraulic systems that overcome the aforementioned shortcomings.

SUMMARY

An integrated electromechanical and hydraulic system is disclosed. The integration includes an electric machine. The electric machine includes a casing, a stator adapted to remain stationary within the casing, one or more electrically insulated windings coupled to the stator, a rotor separated from the stator and the one or more windings by a radial diamagnetic gap, electrical power couplings, and a first mechanical power couplings. The integration also includes a hydraulic machine also disposed in the housing, the hydraulic machine having hydro-mechanical couplings as well as a second mechanical power couplings, wherein the second mechanical power couplings are coupled to the first mechanical power couplings.

A method of integrating an electromechanical and hydraulic system is also disclosed. The method includes providing an electric machine. The electric machine includes a casing, a stator adapted to remain stationary within the casing, one or more electrically insulated windings coupled to the stator, a rotor separated from the stator and the one or more windings by a radial diamagnetic gap, electrical power couplings, and a first mechanical power couplings. The method also includes providing a hydraulic machine also disposed in the housing, the hydraulic machine having hydro-mechanical couplings as well as a second mechanical power couplings, wherein the second mechanical power couplings are coupled to the first mechanical power couplings.

DETAILED DESCRIPTION

Figure 1:
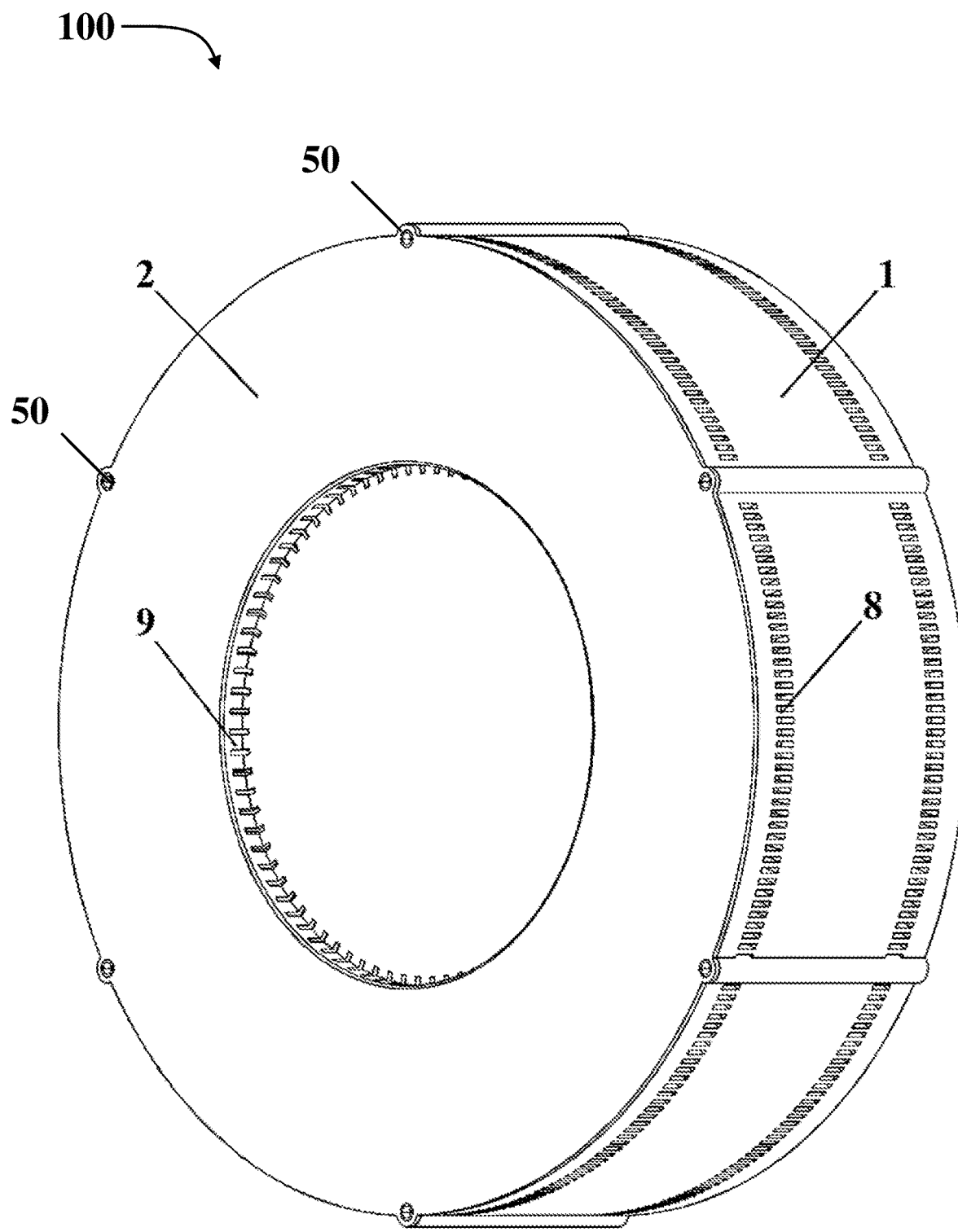
FIG. 1 is a perspective view of an external casing of a hydroelectric system including an electric machine and a hydraulic machine, according to the present disclosure.
Figure 2:
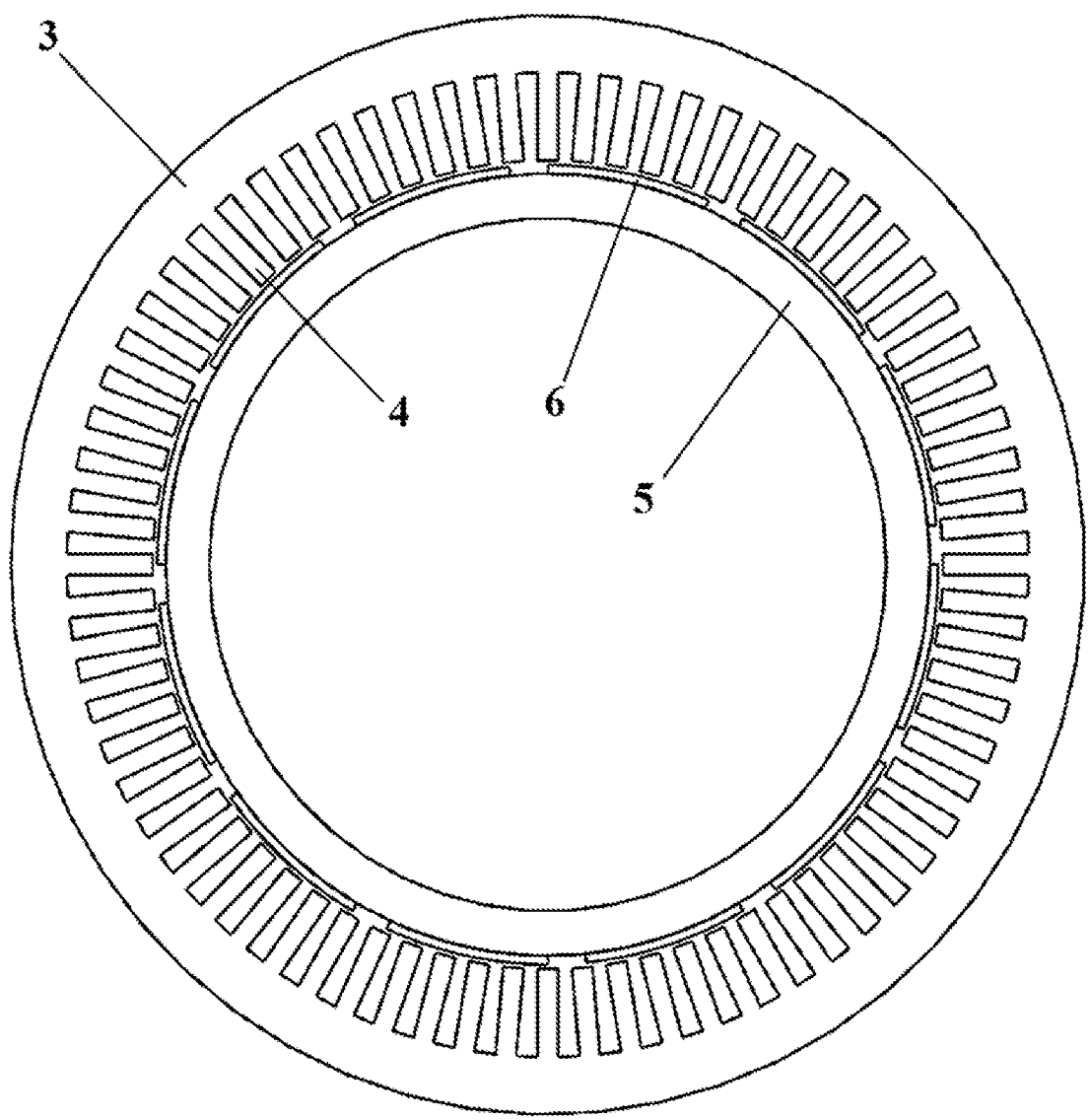
FIG. 2 is a front view of the electric machine, without windings, of the hydroelectric system of FIG. 1.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The system integration presented in the present disclosure includes a novel combination of two fundamental elements: a hydraulic machine (pump/motor) and an electric machine (motor/generator). Specifically, the electric machine includes a stator and a rotor, and the pump includes two rotating fluid displacement elements, one or more balancing element and a plurality of bearing elements. The electric machine and the hydraulic machine are coupled by a drive flange. The device design is conceived to allow the use of elements according to a first modality based on conversion of electric power into hydraulic power; and vice versa, according to a second modality. Thus, the electric machine can act as motor or as generator depending on the phase of the duty cycle it is working in. Equally, the hydraulic device can act as a pump or as motor depending on the phase of the duty cycle. This also implies that this design permits both the machines to rotate in both directions. Furthermore, the device presented here can be adapted to work in dry or in wet conditions as long as slight changes are applied to the design. By dry condition it is meant that the working fluid presence is included only in the pump casing. In this case a system of fans coupled to the rotor cool the electric machine promoting the air circulation through the windings. Also, holes in the electric machine casing 1 allows cooler air to flow in and improve the cooling effect. On the other hand, by wet condition it is meant that fluid is exchanged between the hydraulic machine casing and the electric machine casing, where the working fluid (i.e., the hydraulic fluid) may be cooled downstream using a cooling means (active or passive). This configuration (wet configuration) is achieved by coupling the low-pressure line of the hydraulic system to the electric machine casing. Using such a solution the electric machine is flooded and its casing behaves as an intermediate tank where the hydraulic machine extracts fluid from the casing or discharges fluid into the casing is depending on the phase of the duty cycle. The recirculation can be improved by machining openings on the hydraulic machine casing and forcing an additional leakage of fluid through the bearing elements of the drive and driven shaft. Accordingly, the working fluid in the hydraulic system subjected to a pressure gradient that promotes the circulation into the casing in heat exchanger jackets of the electric machine 70 to cool the same. This approach provides a more robust cooling effect to the electric machine, that results in an increase of efficiency. In this case the electric machine casing 1 must have a return line to a low-pressure source like a tank or an accumulator.

Thus, according to one embodiment of the present disclosure, taking advantages of its higher density power, the hydraulic machine is housed inside the electric machine, in a robust integration scheme resulting in a more compact system that is easier to accommodate in tight places. Such an approach, provides an opportunity of the usage of thicker windings and lower voltage electric systems that represents a more robust solution.

Assembly

Referring to FIG. 1 a perspective view of a hydroelectric system 100 according to the present disclosure is shown. The hydroelectric system 100 is housed in an electric machine casing 1 which is hollowed cylindrical-shaped structure. The electric machine casing 1 includes a cover 2 that is removable to allow access to the internal structure of the hydroelectric system 100 and in particular for the assembly of the system 100. The hydroelectric system includes a hydraulic machine 60 (see FIG. 9 which is a perspective view of the hydraulic machine 60) and an electric machine 70 (see FIG. 10 which is a partial perspective view of the components of the hydroelectric system 100), both discussed below. The dimension ratio of the cover 2 is dictated by the dimensions of the electric machine 70 and its components, discussed below. Both the electric machine casing 1 and the removable cover 2 include a plurality of holes 8 and 9 to allow air exchange needed for proper cooling of the electric machine 70. As will be discussed below, air-cooling is one way to cool the electric machine 70 in the so called dry-mode. In the wet mode, working fluid is exchanged between the hydraulic machine 60 and the electric machine 70 in place of or in addition to the air cooling provided by the holes 8 and 9. Fasteners 50 are shown to mount the removable cover 2 to the electric machine casing 1.

Electric Machine

With reference to FIGS. 2, 3, 4, 5, and 10 the electric machine 70 is shown in various views along with its components. The electric machine 70 (see FIG. 10) can be configured to provide a motor and/or generator functionality and it includes as discussed above. The electric machine 70 includes two major parts: a stator 3 (first shown in FIG. 2 which is a front view of a portion of the electric machine 70) and a rotor 5 (also shown in FIG. 2). The stator 3 is a ring-shaped device, with an internal comb shaped profile, in which teeth 4 are twisted with electrical windings 7 (see FIG. 3 which is a top view of a detail of the electric machine 70 of the hydroelectric system 100). The electrical windings 7 can be connected in parallel or in series and they have at least one phase, however a three-phase configuration is within the ambit of the present disclosure. The stator 3 is typically fixed to a frame, and in the case of the electric machine 70 the stator 3 is fixedly coupled to the electric machine casing 1. The stator 3 can be fixed to the electric machine casing 1 via screws or coupled by interference (i.e., press-fit). The interference coupling solution allows to reduce the dimension of the overall electric machine 70 and thus the hydroelectric system 100 and further to increase the heat exchange by conduction thus ensuring improved cooling.

Figure 3:
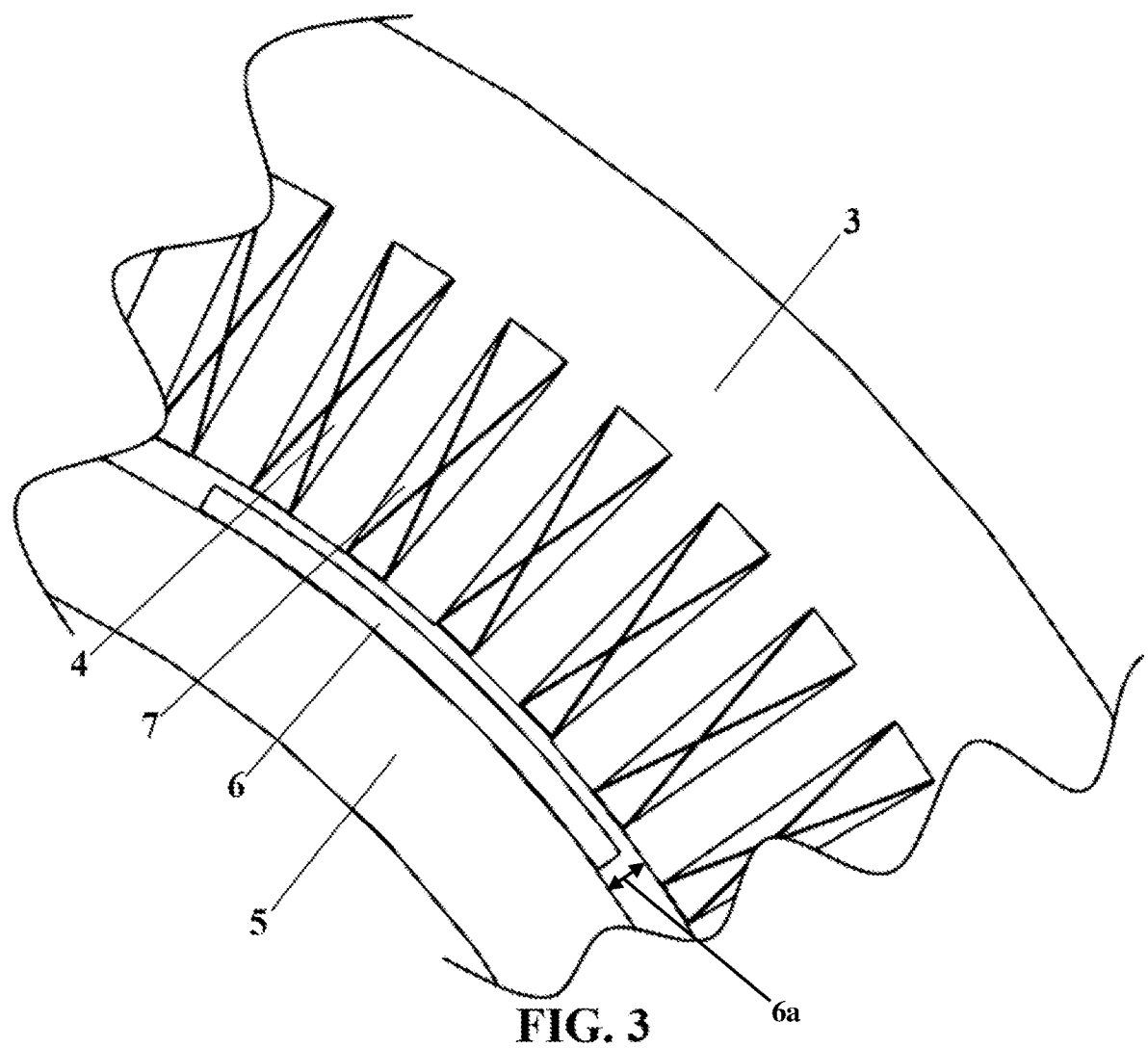
FIG. 3 is a top view of a detail of the electric machine of the hydroelectric system of FIG. 1.
Figure 4:
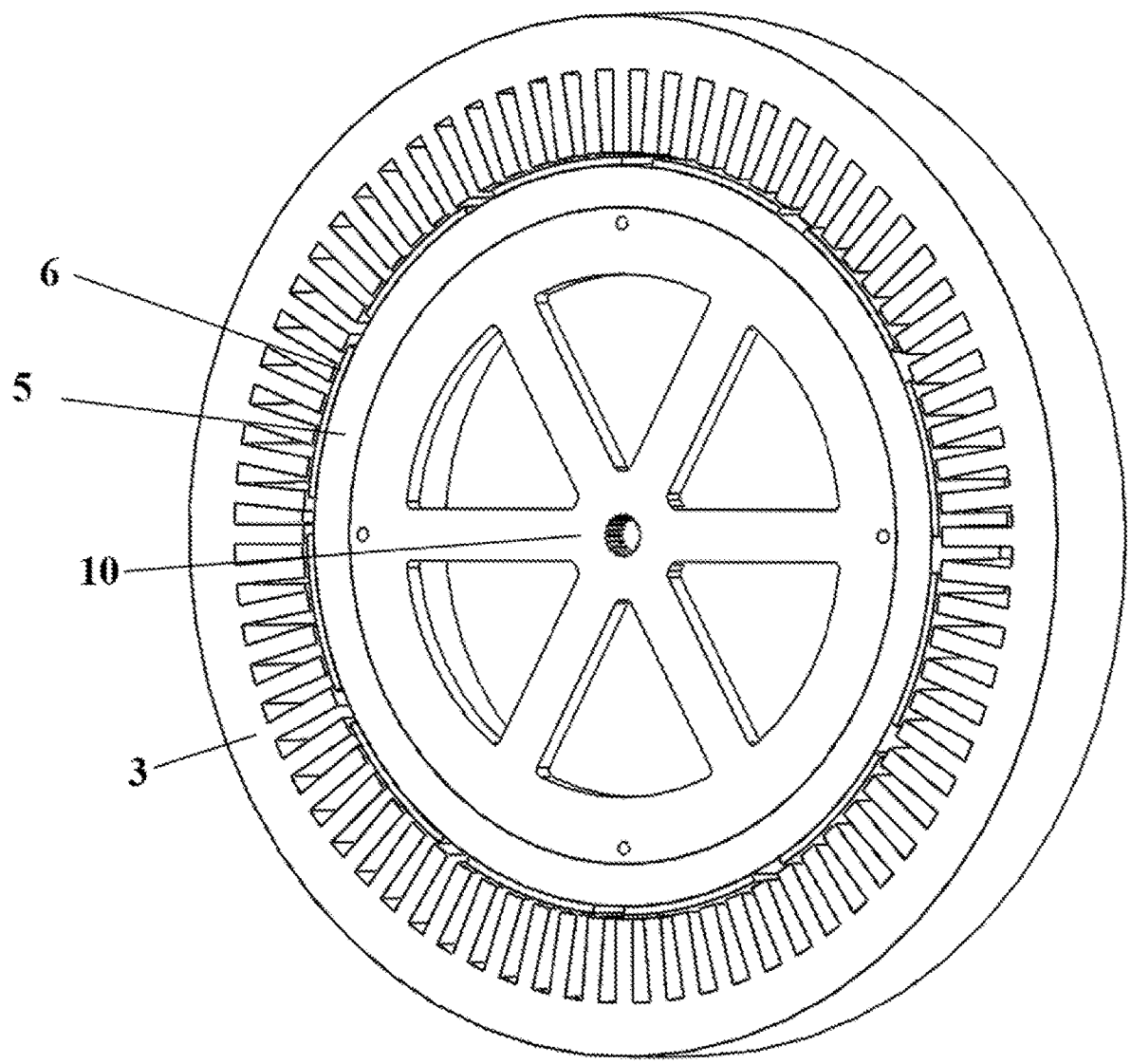
FIG. 4 is a perspective view of the electric machine and drive flange of the hydroelectric system of FIG. 1.
Figure 5:
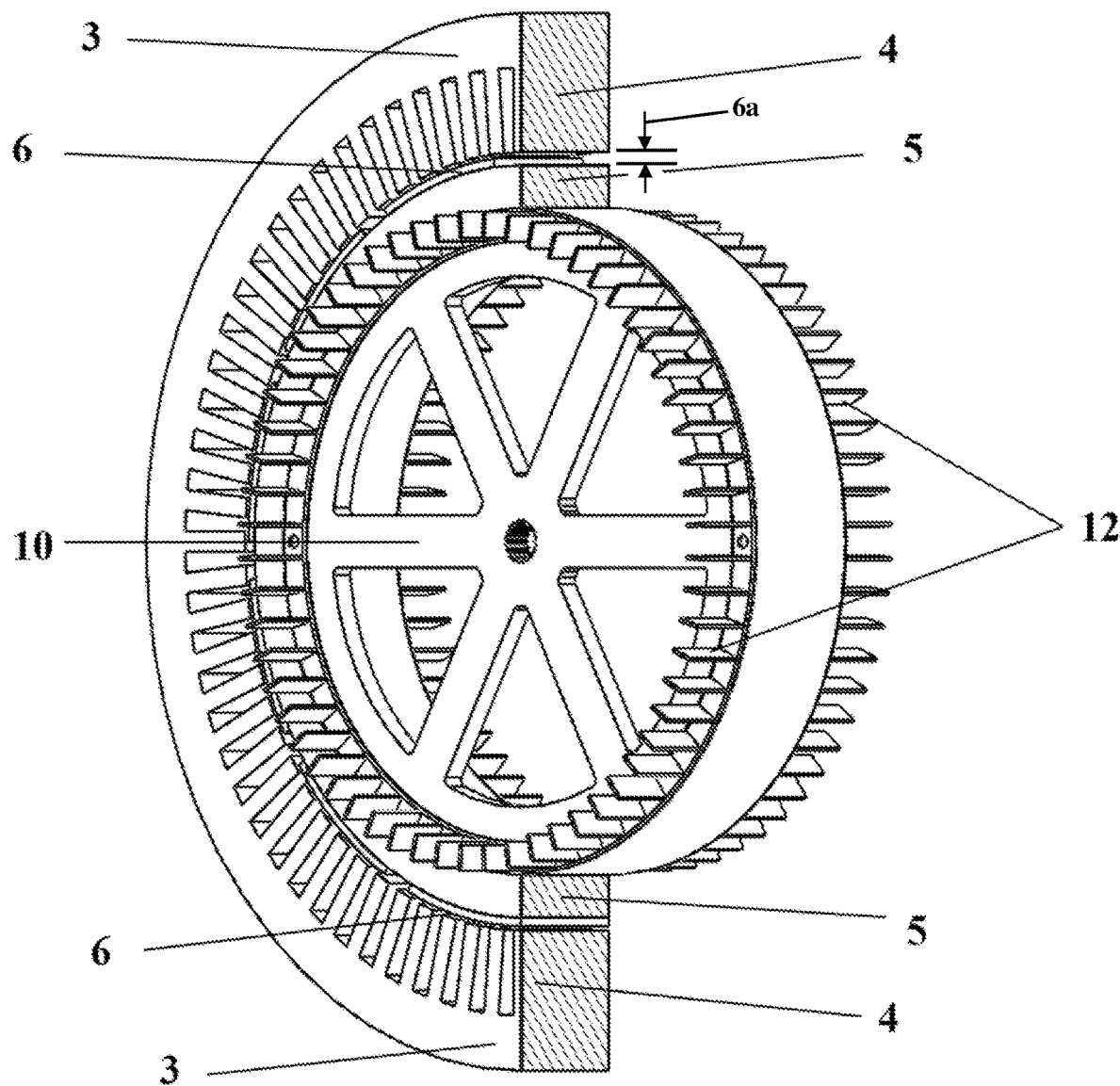
FIG. 5 is a partial perspective cross-sectional view of the electric machine, drive flange, and fan blades of the hydroelectric system of FIG. 1.

While the stator is fixedly coupled to the electric machine casing 1, the rotor 5 is adapted to rotate with respect to the stator 3. It is also a ring-shaped element, in which external radial surfaces include permanent magnet plates 6 installed on said outer surface. As shown in, for example FIG. 2, the rotor 5 and the stator 3 are concentric with respect to one-another. Also as can be seen in FIG. 3, between the stator 3 and the rotor 5 there is a radial diamagnetic gap 6a (also shown in FIG. 5, discussed below). Permanent magnet plates 6 provide magnetic fields which interact with magnetic field(s) generated from the electric windings 7 to thereby promote the relative motion of the two elements. As shown in FIG. 4 which is a perspective view of the electric machine 70 and a drive flange 10 of the hydroelectric system 100, the rotor 5 interfaces with the drive flange 10 which transfers the torque generated by the electric machine 70 from the rotor 5 to the hydraulic machine 60 and vice versa (i.e., transfer the torque generated by the hydraulic machine 60 to the electric machine 70). The drive flange 10 can be fixed to the rotor 5 through screws or coupled by interference (i.e., press-fit). The interference embodiment saves space and reduces number of fasteners and thus complexity. The drive flange 10 can be milled (as shown in FIGS. 3 and 4) to reduce the inertia moment and allow the cooling airflow movement inside the casing 1 of the electric machine 70. Also, fan blades 12 shown in FIG. 5 (which is a perspective view of several components of the electric machine 70) can be installed on the drive flange 10 so that when the drive shaft 10 is rotating, improved air movement can result in enhanced heat exchange.

As discussed above, the drive flange 10 couples the rotor 5 of the electric machine 70 to the hydraulic machine 60. In particular, the drive flange 10 is coupled to a rotating shaft 22 (see FIG. 9) responsible for fluid displacement within the hydraulic machine 60. A coupling between the drive flange 10 and the rotating shaft 22 may include a spline 13 (see FIG. 6 which is a cross sectional view of the hydroelectric system 100 and FIG. 9) and a key (not shown). These solutions ensure proper torque transmission, but they do not constrain the respective elements axially. A nut 14 (see FIG. 6 and FIG. 9) is thus used to bring these components to a secured coupling.

Hydraulic Machine

Figure 6:
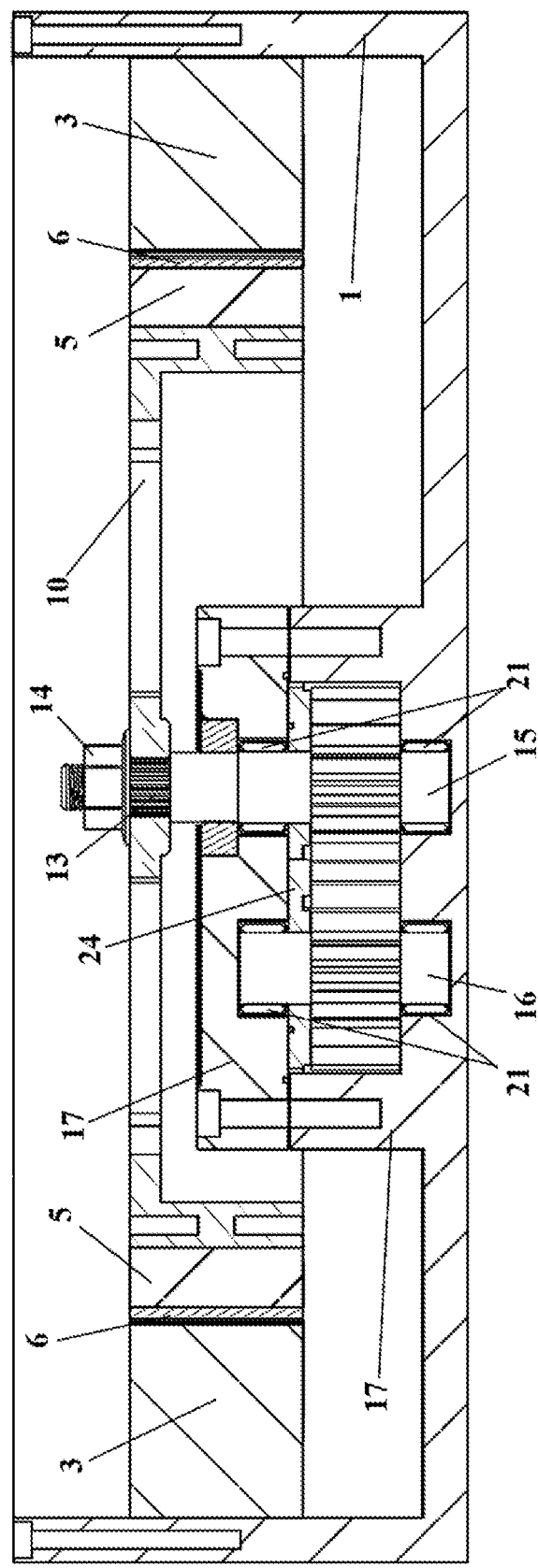
FIG. 6 is a partial cross-sectional view of the of the hydroelectric system of FIG. 1.
Figure 9:
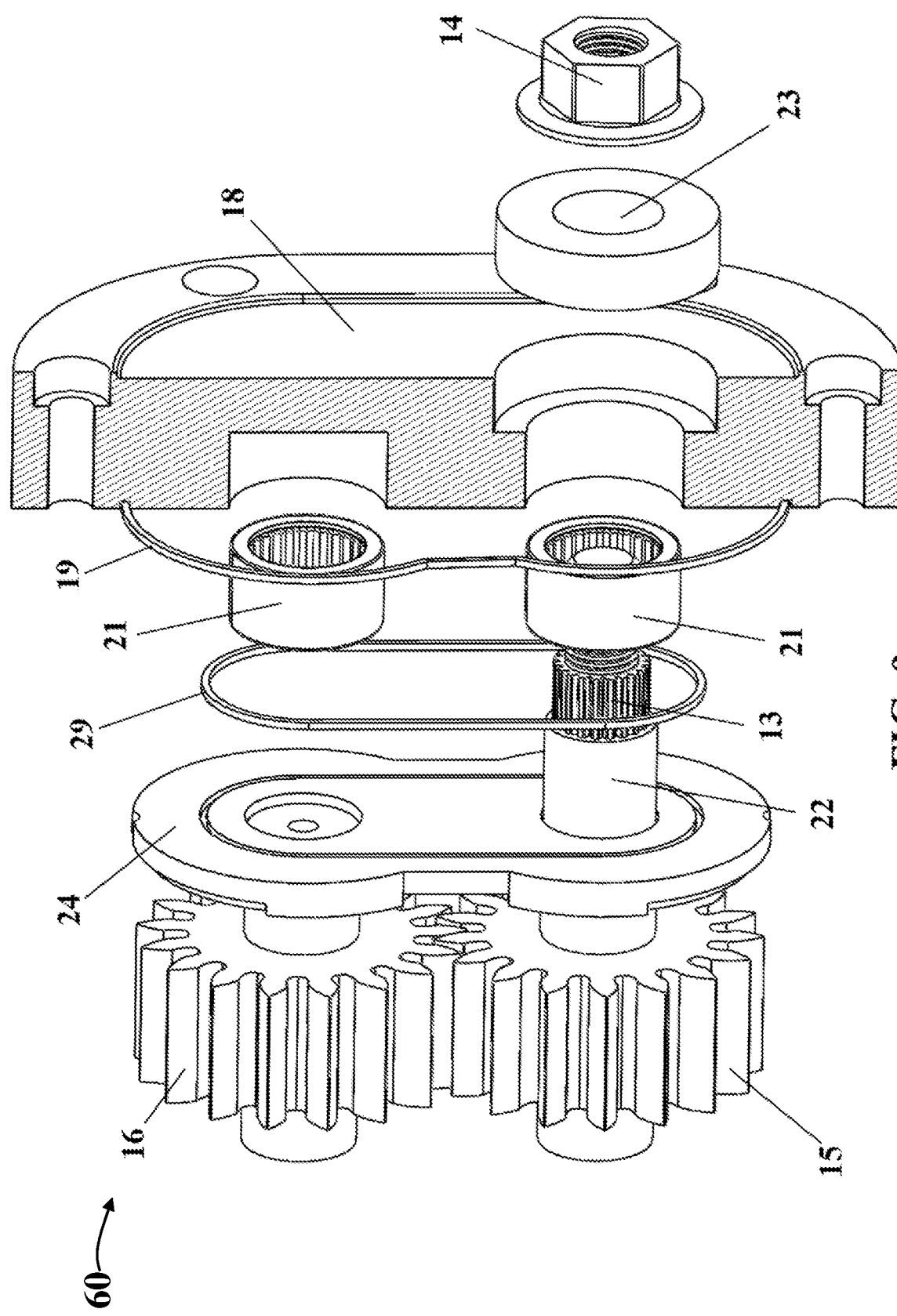
FIG. 9 is a perspective exploded partial cross-sectional view of the components inside the hydraulic machine, according to the present disclosure.
Figure 10:
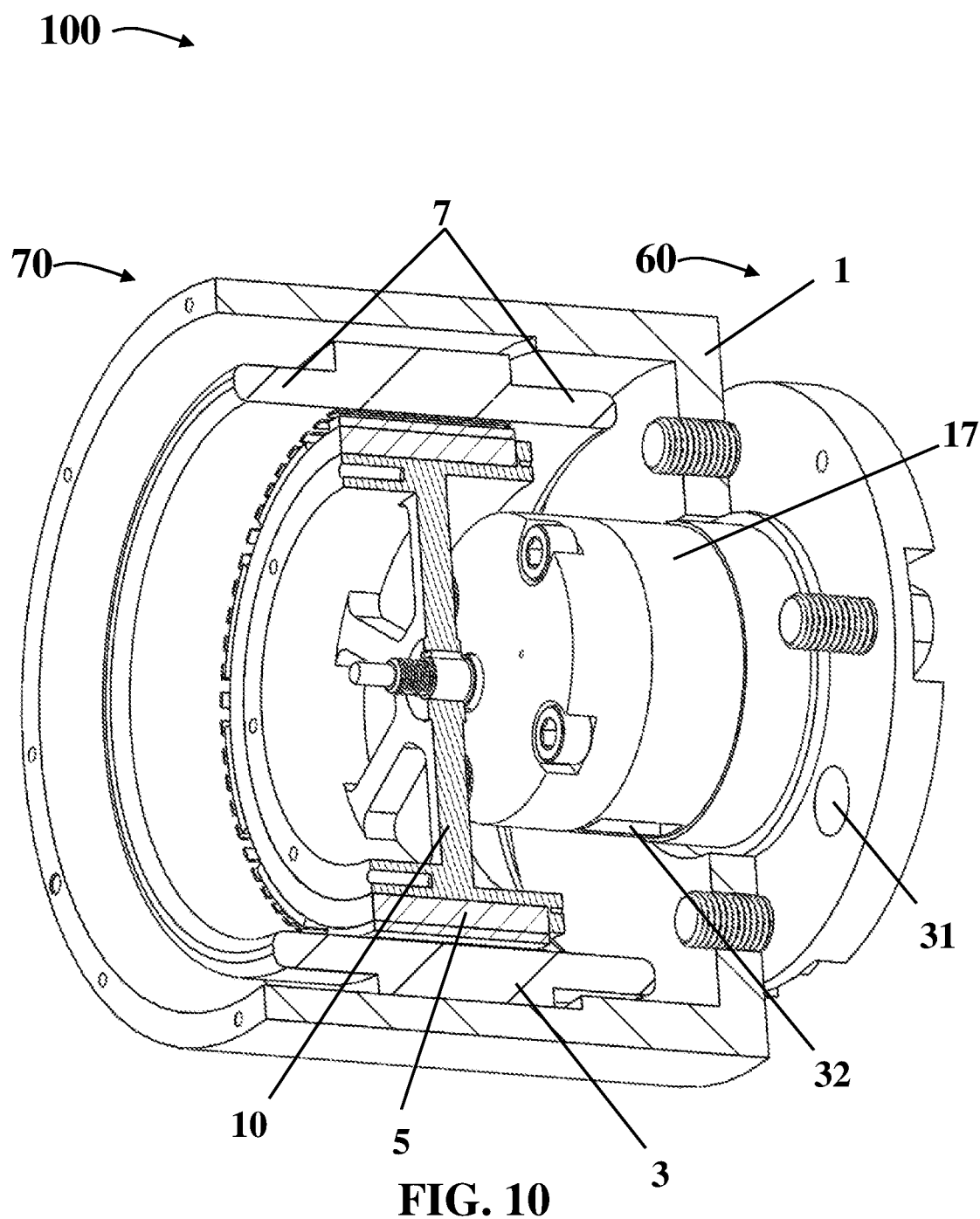
FIG. 10 is a partial perspective view of the components of the hydroelectric system of FIG. 1.

Internal structure of the hydraulic machine 60 is shown in FIG. 9, which as discussed above is a perspective exploded partial cross-sectional view of the components inside the hydraulic machine 60, according to the present disclosure. With further reference to FIG. 6, the drive fluid displacement rotating element, herein called drive gear 15, is coupled with another rotating fluid displacement element, herein named driven gear 16. Both gears are housed in a hydraulic machine casing 17 (see FIG. 10). The drive gear 15 axis is concentric with respect to the electric machine 70. On the other hand, since the hydraulic machine is designed to use external gears, the driven gear 16 axis is eccentric with respect to the electrical machine 70. As shown in FIG. 6 the electric machine casing 1 and the hydraulic machine casing 17 can be sourced from the same casting. The hydraulic machine casing 17 has a removable cap 18 on one side that allow the assembly of the hydraulic machine 60. In the removable cap 18 there is a groove that allows the installation of a seal 19 (see FIG. 9) to thus prevent leakages. Also, since robust tolerances are needed, there can be centering pins that ensure the proper positioning of the removable cap 18 with respect to the casing. Depending on the duty cycle phase, the drive gear 15 and the driven gear 16 can mesh together, isolate a volume of fluid in a low-pressure zone and transfer it to a high-pressure zone. In this case the device has a pumping function driven by the electric machine 70 used as a motor. Otherwise, the drive gear 15 and the driven gear 16 can mesh together as they can take advantage of the flow promoted by the presence of a high-pres sure source and a low-pressure source, to extract kinetic energy from the working fluid and deliver it to the electric machine 70, in which case the hydraulic machine 60 is working in motoring mode and the electric machine 70 is operating as a generator. The high-pressure source and the low-pressure source are connected with the inner part of hydraulic machine by two channel ports 28. It must be appreciated that since the machine can be reversible it is not always possible to define which channel port 28 is connected to the high-pressure source and which to the low-pressure source. The hydraulic machine also includes a bearing system 21. It can be designed with a variety of different kinds of bearing system elements including journal bearing and roller bearing with cylindrical roller, spherical roller, tapered roller or needle roller. The bearing system 21 can be installed in the hydraulic machine casing 17 electric machine casing, in the hydraulic machine removable cap 18, or in thrust plates 24 that constitute axial compensation. The lubrication for the bearing system 21 is performed by the working fluid that is configured to flood it. The working fluid can reach every element of the bearing system 21 through designated channels inside the driven gear shaft or grooves in the thrust plates 24. Since the connection between the hydraulic machine 60 and the electric machine 70 is achieved through the shaft of the drive gear 15, a shaft seal 23 in the hydraulic machine lid is needed to prevent the leakages of working fluid through the bearing system 21 and the shaft hole. Inside the hydraulic machine casing 17 there is at least one thrust plates 24. The thrust plates 24 have grooves on both sides of its surface. The grooves on the surface that face the gear have a fluid-dynamic function. The grooves on the surface that faces the hydraulic machine casing 17 instead, ensure the thrust plates 24 maintain pressure on the lateral surface of the gears to minimize the gap and the leakages. On this surface there must be a seal 29 that define a high-pressure zone and a low-pressure zone.

As discussed above, the integrated system according to the present disclosure can be designed to work in wet conditions. In this case there are no cooling holes in the electric machine casing 1 and electric machine casing cover 2. The wet condition enables an advanced cooling strategy. Reversing the differential pressure between its ports (pumping and motoring in both rotational directions) the above-referenced cooling strategy implies slightly different embodiments. In case the machine cannot reverse the differential pressure built between its ports, referring to FIG. 10 it should be noted that the low-pressure line of the system is connected to the electric machine casing 1 through a low-pressure port 31. This connection leads to the flooding of the casing. From the flooded electric machine casing 1 the hydraulic machine extract fluid through the inlet port 32. Also, referring to FIG. 11 which is a cross sectional view of the components of the hydroelectric system 100, the openings 33 can be seen which forces additional leakages of working fluid from the inside of the hydraulic machine 60 to the electric machine casing 1 through the bearing system 21 of the hydraulic machine 60. One opening is machined on the driven gear 16 side, the other is machined on the drive gear 15 side and take advantage of the absence of shaft sealing. This solution leads to a better recirculation and a more homogeneous and effective cooling of the hydraulic machine.

In case the machine can reverse the differential pressure built between its ports it is not possible anymore to define a low-pressure port and a high-pressure port, and for this reason the casing cannot be used as intermediate tank. More precisely, both the channel ports 28 of the hydraulic machine are connected to the system excluding the electric machine casing 1 from the main line. The only connection between the hydraulic machine and the electric machine casing 1 happen through the openings 33 described in the previous paragraph. Therefore, to allow the recirculation the electric machine casing 1 is independently connected to the low-pressure line. According to another embodiment, check valves shown in FIG. 13 can be used.

Figure 7:
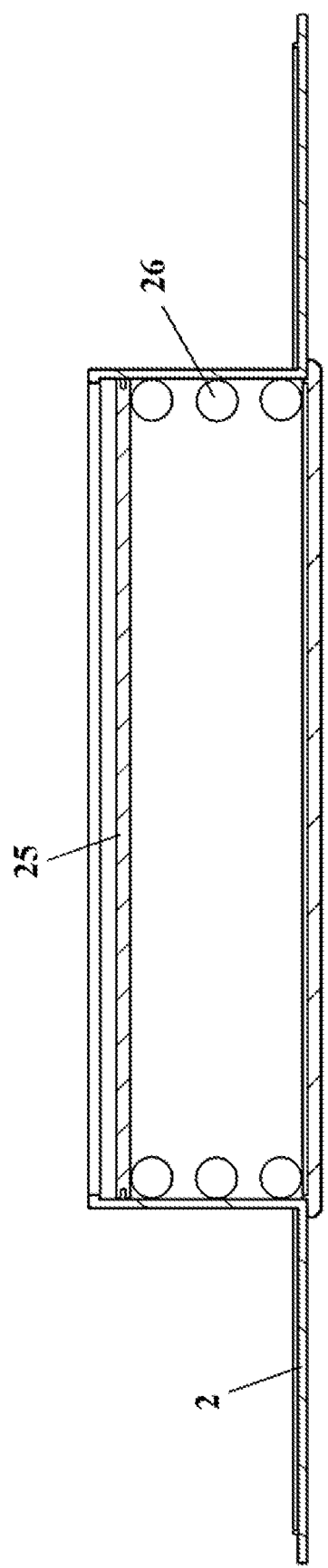
FIG. 7 is a cross sectional view of the electric machine casing lid designed to transform the casing into an accumulator, according to the present disclosure.
Figure 8:
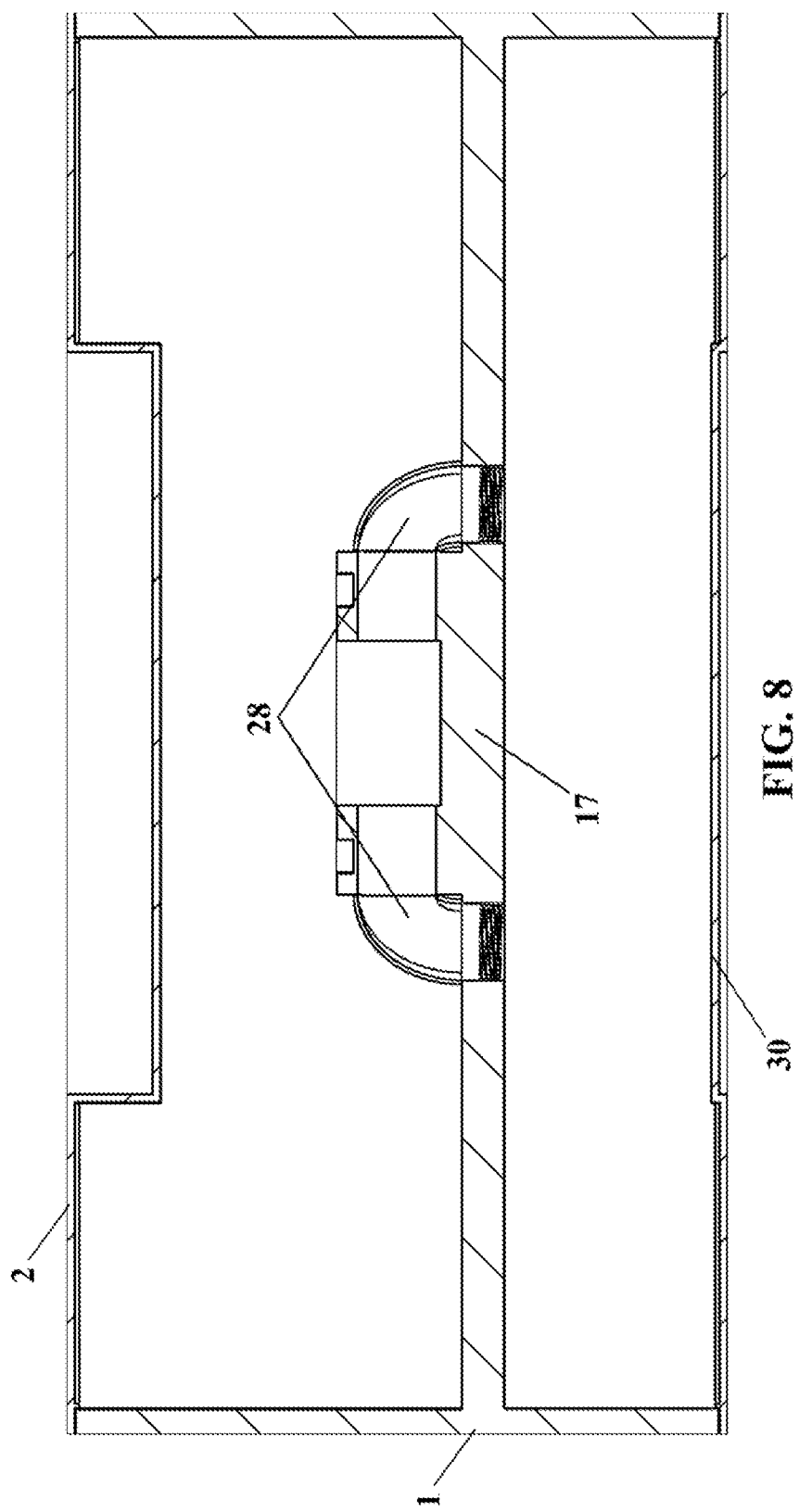
FIG. 8 is a cross-sectional view of the casing designed to house auxiliary components, according to the present disclosure.

Moreover, in case of wet condition, referring to FIG. 7 which is a cross sectional view of the electric machine casing removable cover 2, the electric machine removable cover 2 can be designed to allow the casing to be an accumulator. This functionality is achieved by the addition of a mobile surface 25 or an elastic surface that divide the overall volume in two parts. If a mobile surface 25 is adopted the device will be equipped with a spring 26 that ensure the maintenance of a specific pressure. Also, the spring 26 and the mobile surface 25 system ensure that even though the working fluid flows to the actuator the electric machine is always completely flooded. The function of the elastic surface, also called bladder is the same. Furthermore, if the spring 26-mobile surface 25 is chosen it is necessary the use of a retaining system 27 of the spring that allow its installation. On the other hand, if a bladder system is chosen, a port to fill the bladder chamber with an inert fluid is needed. Another alternative embodiment, as shown in FIG. 8 which is a cross-sectional view of the electric machine casing 1 and its removable cover 2 designed to house auxiliary components including channel ports 28 has extra space to the opposite side of the electric machine removable cover 2 to house the valves and the electronic devices needed to achieve a proper control of the electric machine. To protect these components this second vane includes a cover 30.

Figure 12:
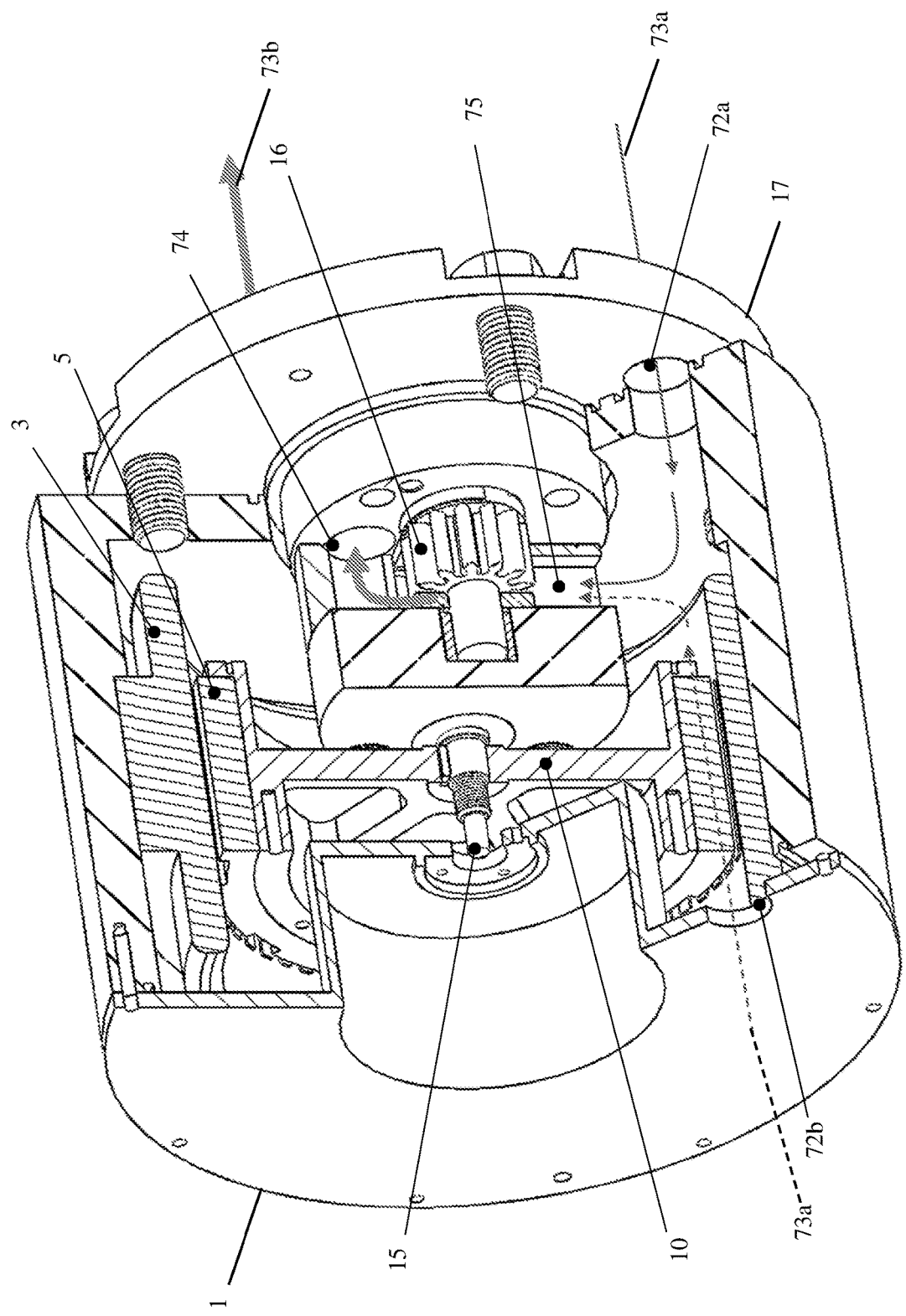
FIG. 12 is a cutaway perspective view of the hydroelectric system of FIG. 1 depicting direction of fluid flow into the electric machine from the working fluid of the hydraulic machine.
Figure 13A:
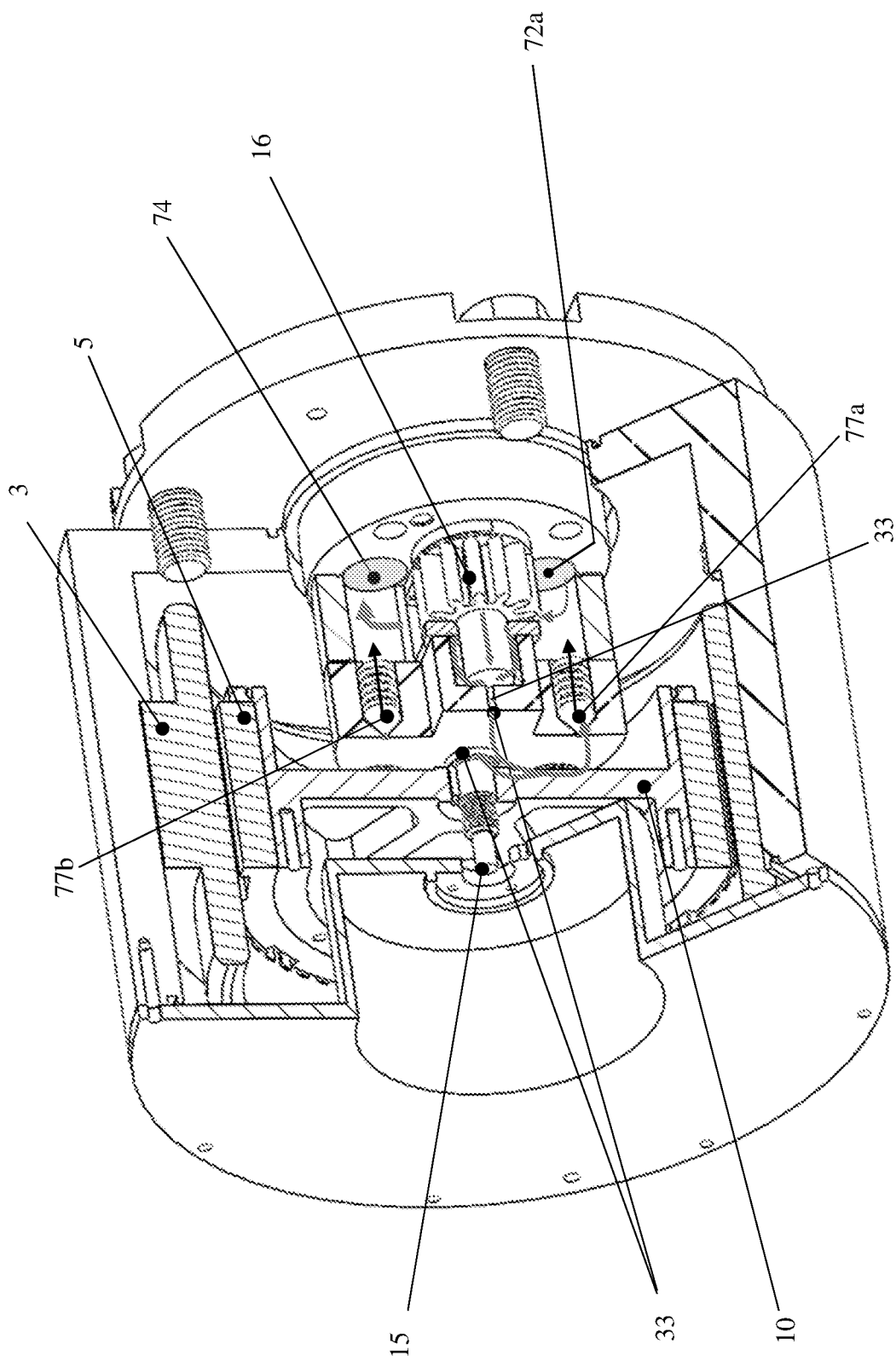
FIG. 13a is another cutaway perspective view of the hydroelectric system of FIG. 1 depicting direction of fluid flow into the electric machine from the working fluid of the hydraulic machine.
Figure 13B:
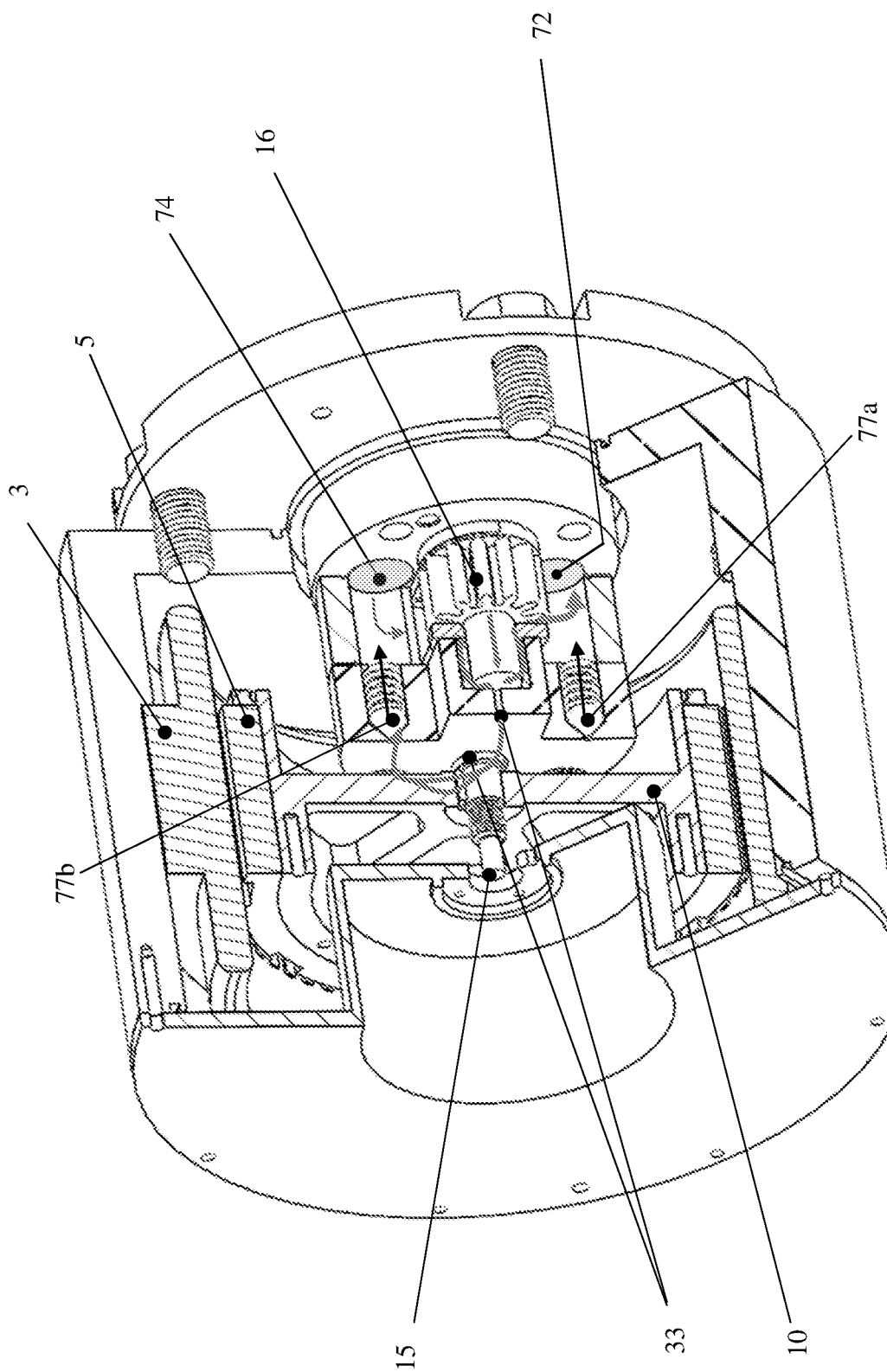
FIG. 13b is yet another cutaway perspective view of the hydroelectric system of FIG. 1 depicting direction of fluid flow into the electric machine from the working fluid of the hydraulic machine.

Referring to FIGS. 12 and 13a and 13b which are cutaway perspective views of the hydroelectric system 100, the wet modality first discussed with respect to FIG. 7 is further depicted. Two different embodiments are shown in FIGS. 12, 13a, and 13b, with two different operating conditions in FIGS. 13a and 13b. In each of these figures, light weight arrows depict low pressure (pressure at inlet), and thick weight arrows depict high pressure (pressure at outlet). In FIGS. 13a and 13b, intermediate weight arrows represent intermediate pressure, higher than inlet pressure but lower than outlet pressure. In FIG. 12, additional detail for cooling is depicted, which include hydroelectric system 100 inlet ports 72a and optionally 72b allowing working fluid 73 to enter the hydraulic machine casing 17 and the electric machine casing 1, respectively, outlet port 74, and hydraulic machine 60 inlet port 75. Working fluid shown as 73a enters the hydraulic machine casing 17 (and optionally electric machine case 1 via inlet 72b). At this low pressure, the working fluid is allowed to flood the electric machine and in particular the diamagnetic gap 6a (e.g., see FIG. 3). The electric windings 7 (see FIG. 3) are encased in an insulating material to thereby electrically insulate the windings 7 from the surroundings. As discussed above, there may be one winding for a single phase or more windings (e.g., three windings for a three-phase electric machine). By flooding the electric machine casing 1, the diamagnetic gap 6a is filled with the low-pressure working fluid 73a. While, a fluid instead of, for example air, will result in additional power losses (i.e., results in a higher power loss to rotate the rotor 5 about the windings 7, the low-pressure working fluid 73a ensures consistent temperature all around the rotor 5, the windings 7, and the stator 3. Consequently, no hotspots would result as compared to prior art cooling based on heat exchangers.

Shown in FIGS. 13a and 13b are two operating conditions of this second embodiment of the wet modality where the embodiment is based on bidirectional rotation of the hydraulic machine 60 where the differential pressure can be reversed between the ports. In FIG. 13a, the low-pressure inlet through which low-pressure working fluid enters is shown as 72a. As the working fluid enters the gears of the hydraulic machine to thereby increase pressure, lateral grooves are provided to allow a calibrated amount of fluid is allowed to leak out of the hydraulic machine via auxiliary openings 33 in the form of passageways and enter into the electric machine at an intermediate pressure, depicted with intermediate weight arrows. In the embodiment shown in FIG. 13a, the intermediate pressure working fluid floods the electric machine casing 1, as discussed with respect to FIG. 12. Check valves 77a and 77b direct the flow. The arrow shown over the check valves 77a and 77b depict the direction of flow. In FIG. 13a, after the intermediate pressure working fluid enters the electric machine casing 1, the fluid is allowed to exit into the area immediate the low-pressure inlet 72a via check valve 77a. No fluid is exchanged between the high-pressure side of the working fluid immediately near the high-pressure outlet 74 and the electric machine casing 1 owing to the direction of flow of the check valve 77b.

The embodiment in FIG. 13b differs in that 72 now represents high-pressure outlet, while 74 represents high pressure inlet. In this embodiment, the intermediate-pressure fluid passes through the check valve 77b into the area immediately near the low-pressure inlet 74. As in FIG. 13a, no fluid is exchanged between the high-pressure side of the working fluid immediately near the high-pressure outlet 72 and the electric machine casing 1 owing to the direction of flow of the check valve 77a.

In all the embodiments depicted in FIGS. 12, 13a, and 13b, the components referred to above allow proper circulation of working fluid through the electric machine 70. The electric machine casing 1 as shown in FIG. 12 functions as an intermediate chamber between the main reservoir of the system (not shown) and the hydraulic machine 60. In the embodiment shown in FIGS. 13a and 13b, the electrical machine casing acts as a side chamber instead. For this reason, the electric machine casing 1 is sealingly mated with other components designed to avoid leakage of working fluid to the outside of the casing 1. As mentioned, filling the electric machine casing 1 with working fluid allows the cooling of the electric machine 70. Towards this end, attention must be paid to the fresh working fluid intake and its recirculation in the electric machine casing. If this aspect is neglected hotspots can generate and damage the electrical components and/or be deleterious to integrity of the working fluid. Use of the hydraulic fluid ensure no hot spots, as the entire electric machine casing 1 is flooded with the working fluid. The fresh working fluid intake is ensured by the suction of the hydraulic machine 60 (as discussed in FIG. 12 and by the intermediate pressure as discussed in FIGS. 13a and 13b). The displacement of high-pressure working fluid generates a depressurization at the inlet of the hydraulic machine 60 and, therefore, in as well in the electric machine casing 1. Such depressurization promotes the transfer of fluid from the main reservoir (not shown) to the electric machine casing 1. The filling of the working fluid in the casing 1 is ensured by the rotation of the moving elements of the electric machine. The optional approach shown in FIG. 12 includes the position of the inlet port 72b on the electric machine casing 1. This, would provide an even more distributed cooling effect of the electric machine. The solid line in FIG. 12 represents the flow path in case the inlet port is on the same side of the outlet port. The dashed line instead represents the flow path in case the inlet port is on the opposite side.

The wet modality described with respect to FIG. 12 of the present disclosure can be implemented to work in 4 quadrants, as depicted in FIGS. 13a and 13b. This means that the electric machine 70 and the hydraulic machine 60 can rotate in both directions and can deliver or receive high pressure flow from both ports 72a and 74. In this case both ports can work as inlet or outlet depending on the phase of the duty cycle, as discussed above.

Figure 11:
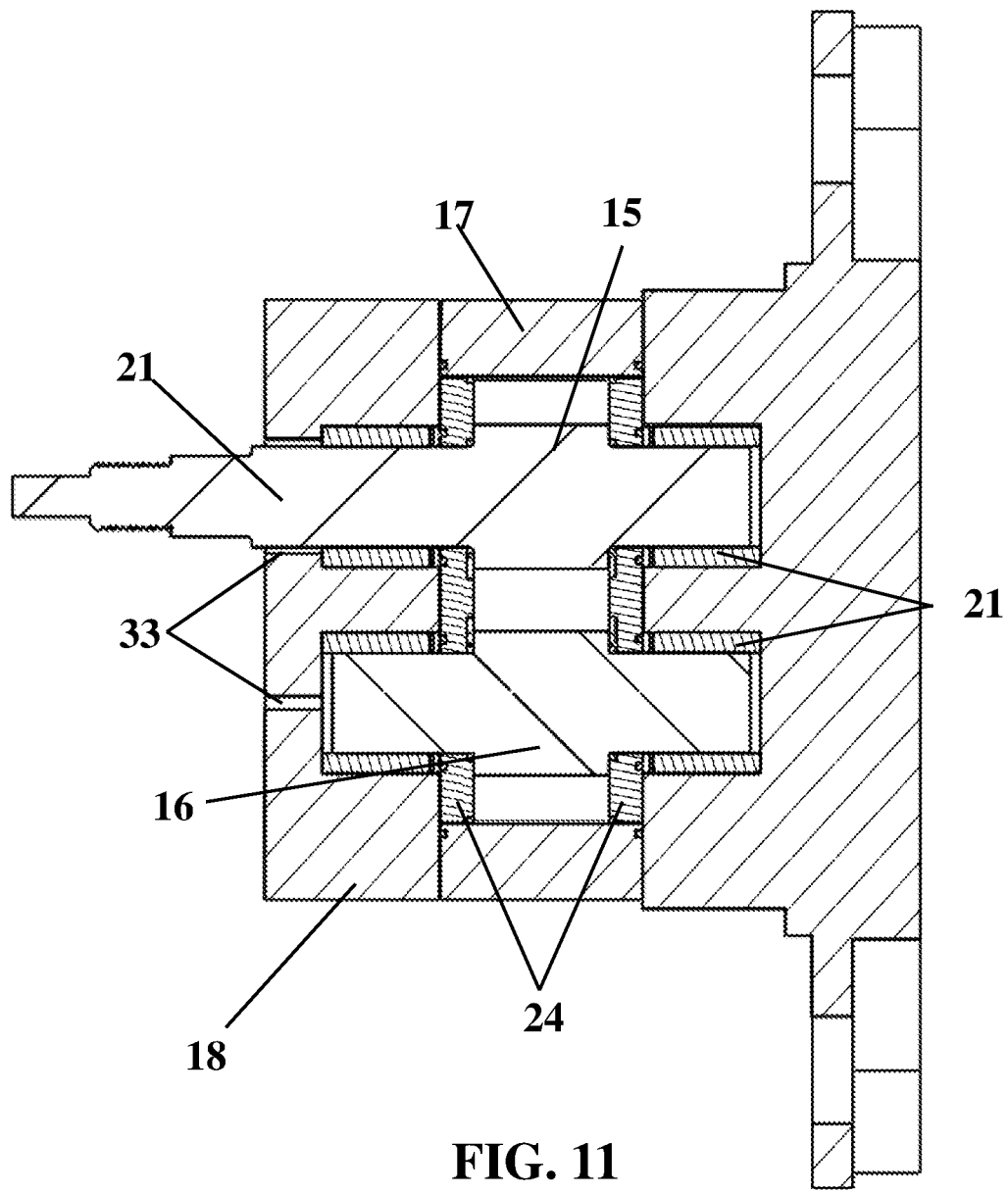
FIG. 11 is a cross sectional view of the components of the hydroelectric system of FIG. 1.

The supply of working fluid in the electric machine casing 1 for cooling purpose happen through the auxiliary openings 33 (also depicted in FIG. 11). The auxiliary openings 33 are ducts machined in the hydraulic machine casing 17 and connect the gears shaft hubs (not shown) with the electric machine casing 1. Through a proper design of the internal elements of the hydraulic machine and the auxiliary openings 33 intermediate-pressure working fluid is redirected according to a calibrated portion of fluid toward the electric machine. Generally, such portion of fluid would be avoided altogether and classified as a leak. After having used some working fluid from the hydraulic machine 60, this must be reintroduced back in the hydraulic machine, and delivered to the hydraulic system where, among all the other things, it will dissipate the heat absorbed from the electric machine 70. To enable the particular wet modality of FIGS. 13a and 13b, as discussed above, two check valves 77a and 77b are used in the hydraulic machine casing 17 and connect the electric machine casing 1 with hydraulic machine low-pressure ports (arrows on the check valves 77a and 77b show the direction of flow). The use of check valves regulates the flow direction allowing the transfer of fluid only toward the low-pressure port. This specific solution implies that 3 different level of pressure are built in the unit. During operation one of the ports is low-pressure, the other port is high pressure, and the electric machine casing 1 is at intermediate pressure. The pressure gradient advantageously promotes the recirculation of working fluid and the proper cooling of the electric machine 70.

The integration of the hydraulic machine 60 and the electric machine 70 into the hydroelectric system 100 advantageously provide a significant volume and improves a power to volume ratio. The inventors of the present disclosure have compared this improvement to various state of the art electric machine and hydraulic machines that are separate (i.e., not integrated) and have further compared those combinations to the hydroelectric system 100 of the present disclosure. This comparison is provided in Table 1, below. In Table 1, the top row provides a variety of hydraulic machine, while the left column provides a variety of electric machines. Each entry in the table represents a power to volume ratio (W/cc) of a mixture of a corresponding hydraulic machine and a corresponding electric machine, where the volume is the sum of the volumes of the two unit and the power used in the ratio is the smaller of the powers of the corresponding two units.

TABLE 1

Comparison of the hydroelectric machine of the present disclosure to state of the art separate electric machines and hydraulic machines

| | Rexroth AZPF 11 V = 1404 cc P = 15897 W | Casappa Polaris PH.20 V = 1503 cc P = 15313 W | Parker PGP511 0110 V = 1166 cc P = 16042 W |
|---|---|---|---|
| Power Density ρ = P/V | | | |
| Toshiba: 0202DPSA31A-P V = 53254 cc P = 14910 W | 0.27 | 0.27 | 0.27 |
| Siemens: Simotics Nema GP100A V = 94710 cc P = 17300 W | 0.16 | 0.16 | 0.16 |

TABLE 1-continued

Comparison of the hydroelectric machine of the present disclosure to state of the art separate electric machines and hydraulic machines

| | Rexroth AZPF 11 V = 1404 cc P = 15897 W | Casappa Polaris PH.20 V = 1503 cc P = 15313 W | Parker PGP511 0110 V = 1166 cc P = 16042 W |
|---|---|---|---|
| Power Density ρ = P/V | | | |
| Marathon: 256TPFSA10087 V = 92710 cc P = 14910 W | 0.16 | 0.16 | 0.16 |

The entries of Table 1 are compared with the hydroelectric system 100 of the present disclosure. According to one embodiment, the hydroelectric system 100 includes the following dimensions: base of 22.9 cm, height of 24.9 cm, axial length of 19.1 cm, volume of 10891 cc, power of 15750 W, and a power to volume ratio of 1.45 W/cc. Therefore, an achievable power to volume ratio of the hydroelectric system 100 of the present disclosure is between about 1 and about 2.

Those having ordinary skill in the art will recognize that numerous modifications can be made to the specific implementations described above. The implementations should not be limited to the particular limitations described. Other implementations may be possible.

The invention claimed is:

1. An integrated electromechanical and hydraulic system, comprising:
   an electric machine, the electric machine comprising:
      a casing,
      a stator adapted to remain stationary within the casing,
      one or more electrically insulated windings coupled to the stator,
      a rotor separated from the stator and the one or more windings by a radial diamagnetic gap; and
   an external gear hydraulic machine disposed in the casing having an external drive gear and an external driven gear in an external meshing zone configuration, wherein the meshing zone generates a sealing arrangement between gears of the external drive gear, the external driven gear, and the casing;
   wherein integration of the electric machine and the external gear hydraulic machine operates as i) a pump when the electric machine is energized; and ii) a generator when the external gear hydraulic machine is energized;
   wherein the external gear hydraulic machine includes a first port for interfacing with a working fluid at a first pressure and a second port for interfacing with the working fluid at a second pressure; and
   wherein the external gear hydraulic machine is configured to communicate fluidly the working fluid with the casing of the electric machine.

2. The integrated electromechanical and hydraulic system of claim 1, wherein the electric machine and the external gear hydraulic machine are interfaced via a flange.

3. The integrated electromechanical and hydraulic system of claim 1, wherein the external gear hydraulic machine communicates with the casing of the electric machine and thereby floods the casing with the working fluid.

4. The integrated electromechanical and hydraulic system of claim 3, wherein the electric machine casing is flooded with the working fluid at the first pressure.

5. The integrated electromechanical and hydraulic system of claim 3, wherein the electric machine casing is flooded with the working fluid at the second pressure.

6. The integrated electromechanical and hydraulic system of claim 1, wherein the external gear hydraulic machine includes passageways configured to communicate fluid.

7. The integrated electromechanical and hydraulic system of claim 6, wherein the communicated fluid has a pressure intermediate between the first pressure working fluid and the second pressure working fluid.

8. The integrated electromechanical and hydraulic system of claim 7, wherein the intermediate-pressure working fluid returns to the first port via a first check valve, while fluid at the second pressure is prevented from communicating with the electric machine casing by a second check valve.

9. The integrated electromechanical and hydraulic system of claim 1, wherein the first port is an inlet and the second port is an outlet and the second pressure is i) higher than the first pressure when the electric machine is energized, and ii) lower than the first pressure when external gear hydraulic machine is energized.

10. The integrated electromechanical and hydraulic system of claim 1, wherein the first port is an outlet and the second port is an inlet and the second pressure is i) lower than the first pressure when the electric machine is energized, and ii) higher than the first pressure when external gear hydraulic machine is energized.

11. A method of integrating an electromechanical and hydraulic system, comprising:
   providing an electric machine, the electric machine comprising:
      a casing,
      a stator adapted to remain stationary within the casing,
      one or more electrically insulated windings coupled to the stator,
      a rotor separated from the stator and the one or more windings by a radial diamagnetic gap; and
   providing an external gear hydraulic machine disposed in the casing having an external drive gear and an external driven gear in an external meshing zone configuration, wherein the meshing zone generates a sealing arrangement between gears of the external drive gear, the external driven gear, and the casing;
   wherein integration of the electric machine and the external gear hydraulic machine operates as i) a pump when the electric machine is energized; and ii) a generator when the external gear hydraulic machine is energized;
   wherein the external gear hydraulic machine includes a first port for communication with a working fluid at a first pressure and a second port for communication with the working fluid at a second pressure, higher than the first pressure; and
   wherein the external gear hydraulic machine is configured to fluidly communicate the working fluid with the casing of the electric machine.

12. The method of claim 11, wherein the electric machine and the external gear hydraulic machine are interfaced via a flange.

13. The method of claim 11, wherein the external gear hydraulic machine communicates with the casing of the electric machine and thereby floods the casing with the working fluid.

14. The method of claim 13, wherein the electric machine casing is flooded with the working fluid at the first pressure.

15. The method of claim 13, wherein the electric machine casing is flooded with the working fluid at the second pressure.

16. The method of claim 11, wherein the external gear hydraulic machine includes passageways configured to communicate fluid.

17. The method of claim 16, wherein the communicated fluid has a pressure intermediate between the first pressure working fluid and the second pressure working fluid.

18. The method of claim 17, wherein the intermediate-pressure working fluid returns to the first port via a first check valve, while fluid at the second pressure is prevented from communicating with the electric machine casing by a second check.

19. The method of claim 11, wherein the first port is an inlet and the second port is an outlet and the second pressure is i) higher than the first pressure when the electric machine is energized, and ii) lower than the first pressure when external gear hydraulic machine is energized.

20. The method of claim 11, wherein the first port is an outlet and the second port is an inlet and the second pressure is i) lower than the first pressure when the electric machine is energized, and ii) higher than the first pressure when external gear hydraulic machine is energized.

* * * * *